United States Patent Office 3,056,333
Patented Oct. 2, 1962

3,056,333
PROJECTOR ATTACHMENT FOR PHOTOGRAPHIC CAMERAS
Karl Schiele, Braunschweig, Germany, assignor to Franke & Heidecke, Fabrik Photographischer Präzisions-Apparate, Braunschweig, Germany, a firm of Germany
Filed Dec. 14, 1960, Ser. No. 75,822
Claims priority, application Germany Dec. 23, 1959
4 Claims. (Cl. 88—26)

This invention relates to a projector attachment whereby a photographic camera, particularly a camera of the twin lens reflex type, can be made into a projector for home use, for projecting slides or transparencies onto a screen.

Attachments for this same general purpose are already known, an example thereof being Breitman Patent 2,744,444, granted May 8, 1956.

An object of the present invention is the provision of a generally improved and more satisfactory attachment or accessory for the purpose above mentioned.

Another object is the provision of an accessory or attachment of lighter, more compact, and less expensive form than those heretofore known.

A further object is the provision of a lighting or illuminating unit so designed and constructed that it forms a base on which the camera may rest in an inverted or upside down position, thus enabling the elimination of columns or standards heretofore needed for holding the illuminating unit above the camera.

A still further object is the provision of a device of this kind, of the utmost simplicity.

Figure 1:
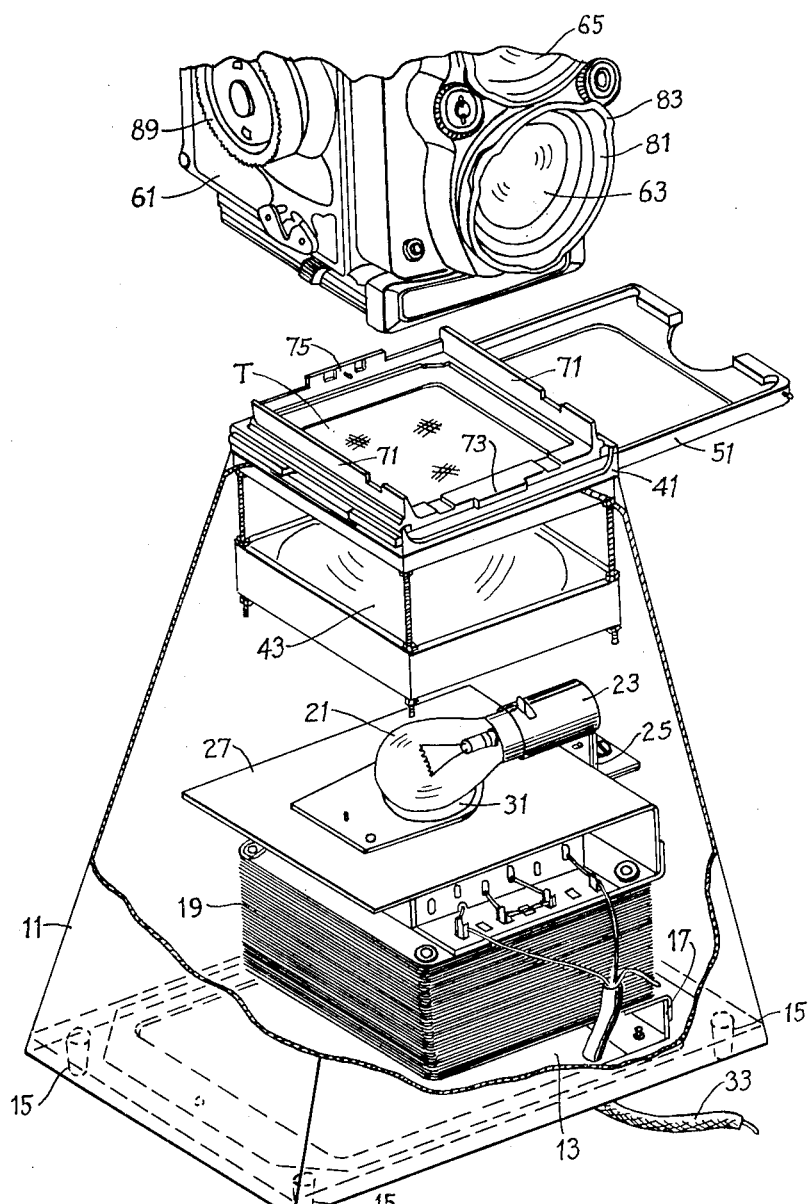
Figure 2:
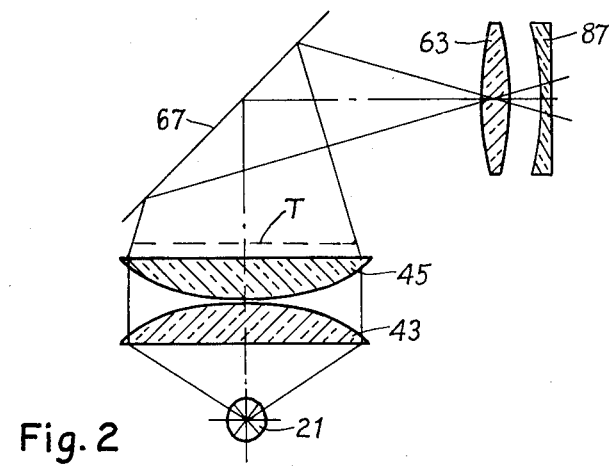

These and other desirable objects may be attained in the manner disclosed as an illustrative embodiment of the invention in the following description and in the accompanying drawings forming a part hereof, in which:

FIG. 1 is a perspective view of a device in accordance with a preferred embodiment of the invention, with part of the casing or housing broken away to show the interior construction, and with a fragment of the camera in a position above the device, ready to be lowered into effective operative position on the top of the device; and FIG. 2 is a schematic optical diagram showing the path of light rays.

Referring now to FIG. 1 of the drawings, the attachment or accessory of the present invention, in its preferred form, comprises an upwardly tapered main housing or casing 11 of conical or preferably pyramidal shape, the bottom wall 13 of which housing is provided with downwardly projecting feet 15 of some suitable material such as rubber, adapted to rest on a table or other furniture without causing scratches or mars. Supported from the bottom 13 by means of a bracket 17 is an electric transformer indicated in general at 19, for supplying electric current to a low-voltage incandescent bulb 21 the socket 23 of which is mounted on a bracket 25 at the side of the transformer. Below the bulb but above the transformer is a plate 27 which supports a small reflecting mirror 31 positioned directly beneath the bulb 21 so as to reflect the light rays upwardly with maximum intensity. Electric current is supplied to the transformer 19, and through the transformer to the bulb 21, from any suitable source of current connected to the apparatus by means of a flexible cord 33.

Arranged in the upper part of the housing 11, centered directly over the bulb 21, is a frame indicated in general at 41, which supports a condenser lens assembly preferably comprising two plano-convex condenser lenses 43 and 45 (see FIG. 2) arranged with their convex faces toward each other, as customary in condenser lenses. The lenses 43 and 45 are supported from the frame 41 in any suitable manner, the details of which are not important for purposes of the present invention. The frame 41 has a horizontal channel for receiving the slide changer frame 51 of known form, so that by placing the photographic slide or transparency in the projecting end of the changer 51 and then shoving this projecting end horizontally toward the frame 41, the slide or transparency can be brought to a central position over the condenser lens assembly, while another slide or transparency at the opposite end of the slide changer 51 is brought to a position laterally of the frame 41, so that it may be conveniently removed to be replaced by another slide.

As already indicated above, the present invention is not confined in its usefulness to any particular type or make of camera, but it is particularly useful with a twin lens reflex camera, and is here disclosed by way of example in connection with the well known camera identified by the trademark "Rolleiflex," manufactured by the firm of Franke & Heidecke, of Braunschweig, Germany, and widely known and used through the United States. It is assumed that the reader is familiar with the main constructional features of the "Rolleiflex" camera, but for those not already familiar with this camera, reference may be made to the book "Rollei Photography, Handbook of the Rolleiflex and Rolleicord Cameras," by Jacob Deschin, published in 1952 by Camera Craft Publishing Company, of San Francisco, California.

A fragment of such a camera, in inverted position, is shown at 61. The camera has a finder lens 63 and a picture taking lens 65. In the normal upright position of the camera, the picture taking lens 65 is below, and the finder lens 63 is above it. The light enters the finder lens 63, is reflected by a mirror indicated diagrammatically at 67 (FIG. 2) and the image falls on a focusing screen (usually of ground glass) arranged horizontally across the top of the camera body 61 and normally shielded or shadowed by a collapsible and erectable focusing hood provided at the top of the camera body. In certain models of the "Rolleiflex" camera, the focusing hood is removable and replaceable on the camera body, and is detachably held in normal position thereon by lugs or projections or flanges on the main frame of the hood which enter suitable slots or openings in the top of the camera body and are held therein by releasable latches.

According to the present invention, when it is desired to use the camera as a projector, the above mentioned focusing hood is removed from the camera, the ground glass focusing screen is also removed, and the camera is turned upside down to an inverted position and placed on top of the previously mentioned frame 41 which is at the top of the present accessory or attachment. The frame 41 is provided with projecting flanges or lugs 71, 73, and 75 which are duplicates of those normally found on the base frame of the focusing hood customarily used with the camera. Thus when the camera 61, in an inverted position and with the focusing hood removed, is placed on top of the frame 41 of the present attachment or accessory, these lugs or flanges 71, 73, 75 will enter the hood-retaining slots or openings in the camera body and will be releasably latched or retained therein in exactly the same way that the foldable focusing hood is normally releasably latched to the camera body. In the light of the foregoing explanation, this will be clear to those skilled in the art who are familiar with a camera of the type above mentioned and with the insertion and removal of the focusing hood thereof.

As customary in a camera of the type mentioned, the viewfinder lens or focusing lens 63 is surrounded by a bayonet mount 81 having conventional bayonet lugs 83 thereon, for receiving a bayonet mount of any desired attachment or accessory such as a supplementary lens. By means of these bayonet flanges, a supplementary lens of any desired power is mounted in front of the finder lens 63, if necessary to enable focusing the camera on a viewing screen at a desired distance, such a supplementary lens being diagrammatically illustrated at 87 in FIG. 2. Such a lens may at times be necessary, depending upon the desired distance of the projector from the screen, because the focusing range of the camera when converted to use as a projector is somewhat different from the focusing range of the camera for normal picture taking purposes, on account of the fact that the transparency to be projected does not lie in the normal plane of the focusing screen, but in a plane a little below the plane of the focusing screen, when the camera is in this inverted position. In other words, the transparency is slightly farther from the lens (for any given position of the lens relative to the camera body) than the focusing screen would be, if such screen were present.

The use of the present invention is very simple. When it is desired to project transparencies, the focusing hood is removed from the top of the camera, and the focusing screen (ground glass or the like) is also preferably removed, which can normally be done quite easily when the hood is removed. Then the camera is turned upside down and placed on top of the frame 41 which is at the top of the pyramidal casing 11 of the present attachment or accessory. The camera is firmly seated (in its inverted position) on the frame 41, being latched thereto by the same means which normally latch the focusing hood to the top of the camera. Then the lamp 31 is turned on, and the first transparency to be projected is placed in the projecting end of the sliding frame or slide changer 51, and this projecting end is then shoved into a position centered in the stationary frame 41, so that the transparency lies on the optical axis of the attachment, and approximately in the position indicated diagrammatically at T in FIG. 2. The usual focusing knob 89 on the side of the camera body is then manipulated to move the lenses 63 and 65 forwardly or backwardly as may be required to focus the image on the projection screen set up at the desired distance, the supplementary lens 87 being used if necessary although in some cases it will not be necessary to use any supplementary lens.

The projection of one transparency after another then continues as long as desired, by moving the slide changer frame 51 first in one direction and then in another, to carry a fresh transparency into projection position and to remove the previously projected transparency therefrom.

When the projection operation is completed, it is but the work of a moment to remove the camera from the top of the projection device, and replace the focusing screen and the collapsible hood thereon, so that the camera is again ready for use as a normal picture-taking camera.

Although it is preferred to use condenser lenses 43 and 45 as above explained, it is, of course, possible to omit the condenser lenses and substitute a diffusing screen of ground glass or the like, which is known per se in the art as a substitute for a condenser lens system.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A projector attachment for a twin lens reflex camera of the type having a reflex viewfinder chamber normally lying above a picture taking chamber in the same body and also having a focusing screen at the top of the viewfinder chamber and a collapsible hood above the focusing screen and parts on the hood engaging with the camera body to hold the hood detachably on the camera body, said projector attachment comprising an upstanding casing forming a hollow chamber with a light aperture at its top, parts on said casing substantially duplicating said parts on the hood of the camera, so that the camera may rest in an inverted position on said casing when said hood has been removed from the camera and the camera may be detachably secured to said casing by said parts on said casing engaging the camera in substantially the same way that said parts on the hood engage the camera when the hood is in normal position on the camera, slidable means mounted on said casing for holding a transparency and moving it into and out of projection position extending across said light aperture, and illuminating means within said casing for illuminating a transparency in said projection position, whereby light from the illuminated transparency may pass through the viewfinder chamber and be projected therefrom onto a viewing screen.

2. The combination of projector illuminating means and a twin lens reflex camera of the type having a finder chamber, a movable focusing screen forming a wall which is normally the top wall of the finder chamber, a finder optical system for projecting an image onto the focusing screen, and a removable hood for surrounding the focusing screen when the camera is being used for normal picture taking, said combination being characterized by the inclusion of each of the following features:

(a) the removable hood being detachably secured to the camera by interengaging parts including projections on the hood engageable in recesses in the camera;

(b) the focusing screen and the hood being movable from their normal effective positions with respect to the camera when the camera is to be used in combination with the illuminating means;

(c) the projector illuminating means including a rigid housing containing an electric lamp and optical means for projecting a beam of light from said lamp vertically upwardly to the top of said housing;

(d) the housing of the illuminating means itself forming a rigid support for holding the camera in an inverted position resting upon the top of the housing, without the necessity for any separate supporting column;

(e) the top of the housing being provided with projections which engage in the same recesses in the camera in which the projections of the removable hood engage when the hood is present on the camera, so as to hold the camera in place in an inverted position on the top of the housing;

(f) the illuminating means further including a slide carrier mounted at the top of the housing and movable horizontally to carry a transparency from an offset position to a projection position alined with said beam of light and immediately below the position of the focusing screen in normal picture taking operation, so that an image of the transparency as illuminated by said beam of light may be projected by the finder optical system onto a viewing screen in front of the inverted camera.

3. A slide projector system for projecting an image of a transparency slide onto a viewing screen by utilizing a finder optical system of a reflux camera, said projector system being characterized by the inclusion of all of the following features:

(a) a rigid housing containing an electric lamp and optical means for projecting a beam of light from said lamp vertically upwardly to the top of said housing;

(b) a slide carrier mounted directly on said housing at the top thereof and movable horizontally to carry a transparency from an offset position to a projection position centrally alined with said vertically upwardly projected beam of light;

(c) projections on said housing for engaging in recesses formed in a reflex camera to hold the camera rigidly in inverted position on the top of said housing and supported directly by said housing without independent support.

4. A system as defined in claim 3, further characterized by the inclusion of all of the following additional features:

(d) the reflex camera used in the system is one having:
  (I) a movable focusing screen normally forming a top wall of a finder chamber when the camera is used in an upright position in normal picture taking operations;
  (II) a removable focusing hood normally surrounding the focusing screen when the camera is used in normal picture taking operations;
  (III) recesses in the camera and cooperating projections on the focusing hood for entering the recesses to hold the hood firmly but detachably in position on the camera;

(e) the focusing screen and the focusing hood being movable from their normal effective positions with respect to the camera when the camera is to be used in the projector system;

(f) the projections on the housing correspond at least in part to those on the focusing hood and enter the same recesses in the camera to hold the inverted camera firmly in position on the housing without requiring independent holding means for the camera and without requiring any special formation of the camera to adapt it to use in the projector system.

References Cited in the file of this patent

UNITED STATES PATENTS

| 1,488,950 | Steer | Apr. 1, 1924 |
| 2,744,444 | Breitman | May 8, 1956 |